US010036663B2

(12) United States Patent
Smith (10) Patent No.: US 10,036,663 B2
(45) Date of Patent: Jul. 31, 2018

(54) WEIGHING ROUND BALES (71) Applicant: CNH Industrial America LLC, New Holland, PA (US)

(72) Inventor: Kevin M. Smith, Narvon, PA (US)

(73) Assignee: CNH Industrial America LLC, New Holland, PA (US)

( * ) Notice: Subject to any disclaimer, the term of this patent is extended or adjusted under 35 U.S.C. 154(b) by 151 days.

(21) Appl. No.: 14/757,437

(22) Filed: Dec. 23, 2015

(65) Prior Publication Data
US 2016/0187185 A1    Jun. 30, 2016

Related U.S. Application Data (60) Provisional application No. 62/096,834, filed on Dec. 24, 2014.

(51) Int. Cl.
*G01G 19/08*    (2006.01)
*A01F 15/08*    (2006.01)
*G01G 17/00*    (2006.01)

(52) U.S. Cl.
CPC ......... *G01G 19/08* (2013.01); *A01F 15/0825* (2013.01); *A01F 15/0833* (2013.01); *A01F 15/0875* (2013.01); *G01G 17/00* (2013.01); A01F 2015/0808 (2013.01); A01F 2015/0891 (2013.01)

(58) Field of Classification Search
CPC .. G01G 17/00; G01G 19/08; A01F 2015/0891
See application file for complete search history.

(56) References Cited

U.S. PATENT DOCUMENTS

| 3,126,069 A * | 3/1964 | Shepley | A01F 15/0875 100/1 |
| 3,567,072 A * | 3/1971 | Tenhulzen | G01G 13/00 177/112 |
| 4,362,097 A * | 12/1982 | Rogers | A01F 15/0833 100/88 |
| 5,622,104 A * | 4/1997 | Viesselmann | A01F 15/07 100/88 |
| 5,811,739 A * | 9/1998 | Palmore | A01F 15/0875 177/136 |
| 6,378,276 B1 * | 4/2002 | Dorge | A01F 15/0833 177/136 |
| 7,000,533 B2 * | 2/2006 | Derscheid | A01F 15/0883 100/100 |
| 7,064,282 B2 * | 6/2006 | Viaud | A01F 15/0833 177/136 |
| 7,091,425 B2 * | 8/2006 | Viaud | A01F 15/0825 100/99 |

(Continued)

FOREIGN PATENT DOCUMENTS

EP    1508268 A1    2/2005

*Primary Examiner* — Natalie Huls
(74) *Attorney, Agent, or Firm* — Patrick M. Sheldrake (57) ABSTRACT

The disclosure relates to weighing a bale formed by a harvester such as a round baler. One or more load sensors located in the tailgate section of the harvester are used to obtain weights when the harvester contains a bale and when the harvester is empty. Other factors, including the slope of the surface on which the harvester is location, the size of the bale, the bale moisture, and the shape of the bale are used to adjust the calculated bale weight.

20 Claims, 9 Drawing Sheets

(56) References Cited

U.S. PATENT DOCUMENTS

| | | | |
|---|---|---|---|
| 7,196,277 B1* | 3/2007 | Santi | B28C 5/422 |
| | | | 177/136 |
| 7,197,979 B2* | 4/2007 | Derscheid | A01F 15/0833 |
| | | | 100/5 |
| 7,703,391 B2* | 4/2010 | Duenwald | A01F 15/0715 |
| | | | 100/35 |
| 7,805,914 B2* | 10/2010 | Smith | A01F 15/0883 |
| | | | 100/88 |
| 9,297,688 B2* | 3/2016 | Posselius | A01F 15/0833 |
| 9,585,310 B2* | 3/2017 | Posselius | A01F 15/0833 |
| 2004/0250703 A1* | 12/2004 | Viaud | A01F 15/0825 |
| | | | 100/87 |
| 2005/0257513 A1* | 11/2005 | Smith | A01D 39/00 |
| | | | 56/341 |
| 2009/0217827 A1* | 9/2009 | Duenwald | A01F 15/0715 |
| | | | 100/88 |
| 2012/0109564 A1* | 5/2012 | Kraus | A01F 15/0833 |
| | | | 702/102 |
| 2014/0174303 A1 | 6/2014 | Posselius et al. | |
| 2016/0165803 A1* | 6/2016 | Smith | A01F 15/0833 |
| | | | 700/275 |

* cited by examiner

WEIGHING ROUND BALES

TECHNOLOGY FIELD

The present invention relates generally to weighing round bales, and more particularly to a weighing system incorporated within a harvester for the weighing of a bale formed therein.

BACKGROUND

For many years agricultural balers have been used to consolidate and package crop material to facilitate the storage and handling of the crop material for later use. Usually, a mower-conditioner cuts and conditions the crop material for windrow drying in the sun. When the cut crop material is properly dried, a baler, for example a round baler, travels along the windrows to pick up the crop material and form it into cylindrically-shaped round bales.

More specifically, pickups of the baler gather the cut and windrowed crop material from the ground, then convey the cut crop material into a bale-forming chamber within the baler. A drive mechanism operates to activate the pickups, augers, and a rotor of the feed mechanism. A conventional baling chamber may include a pair of opposing sidewalls with a series of belts that rotate and compress the crop material into a cylindrical shape.

When the bale has reached a desired size and density, a wrapping system may wrap the bale to ensure that the bale maintains its shape and density. For example, a net may be used to wrap the bale of crop material. A cutting or severing mechanism may be used to cut the net once the bale has been wrapped. The wrapped bale may be ejected from the baler and onto the ground by, for example, raising a tailgate of the baler. The tailgate is then closed and the cycle repeated as necessary and desired to manage the field of cut crop material.

This disclosure relates to a weighing system incorporated in the baler that provides weight measurements of the formed bale. Such a system is desirable to eliminate use of a separate scale, while also providing more accurate weight measurements to the operator of the baler and customers soon after completion of forming the bale.

This document describes an apparatus and processes for weighing round bales.

SUMMARY

The disclosure relates to a harvester comprising: a main frame, defining a front section of a bale chamber in which a bale is formed; a tailgate pivotally connected to the main frame by at least a first load pin, defining a rear section of the bale chamber, and configured to pivot open to eject the bale; at least a first load sensor, positioned on or within the at least a first load pin, for measuring a weight force exerted thereon, and at least a first processing unit in operable communication with the at least first load sensor.

In some embodiments, the at least first load sensor is configured to obtain one or a combination of: (i) one or a plurality of reference weights in a first operational state; and (ii) one or a plurality of load weights in a second operational state; wherein the first operational state comprises a bale chamber free of a bale and the second operational state comprises a bale chamber comprising a formed or partially formed bale; and wherein the at least first processing unit is configured to calculate a bale weight value, the bale weight value a function of the one or plurality of reference weights and/or the one or plurality of load weights.

In some embodiments, the at least first processing unit is configured to calculate an adjustment value, the adjustment value a function of one or more of: (i) one or a plurality of slope measurements of the surface upon which the harvester is positioned; (ii) one or a plurality of size measurements of the bale within the bale chamber; (iii) one or a plurality of bale moisture measurements of the bale within the bale chamber, and (iv) one or a plurality of bale shape measurements of the bale within the bale chamber.

In some embodiments, the at least first processing unit is configured to calculate an output value, the output value a function of the bale weight value and the adjustment value.

In some embodiments, the harvester further comprises a monitor comprising a display interface in operable communication with the at least first processing unit, wherein the display interface is configured to display the output value.

In some embodiments, the harvester further comprises one or more tailgate sensors in operable communication with the at least a first processing unit, the one or more tailgate sensors configured to detect the position of the tailgate.

In some embodiments, the harvester further comprises one or more tailgate sensors in operable communication with the at least a first processing unit, the one or more tailgate sensors configured to detect the position of the tailgate; and wherein, in the second operational state, the tailgate position is closed or substantially closed.

In some embodiments, in either a first or second operational state, one or plurality of slope measurements are a function of one or more values indicating a longitudinal angle upon which the harvester is positioned and/or one or more values indicating a lateral angle upon which the harvester is positioned.

In some embodiments, the harvester further comprises one or more inclinometers in operable communication with the at least a first processing unit configured to obtain one or more values indicating a longitudinal angle upon which the harvester is positioned and/or one or more values indicating a lateral angle upon which the harvester is positioned.

In some embodiments, the harvester further comprises one or more inclinometers in operable communication with the at least a first processing unit configured to obtain one or more values indicating a longitudinal angle upon which the harvester is positioned and/or one or more values indicating a lateral angle upon which the harvester is positioned; and wherein the value of the lateral angle upon which the harvester is positioned is calculated by at least two reference weight measurements in which the tailgate of the harvester is in at least two known positions.

In some embodiments, the harvester further comprises one or more bale diameter sensors in operable communication with the at least a first processing unit configured to obtain a size measurement of the bale within the bale chamber. In some embodiments, the size measurement of the bale is a function of a center of mass location of the bale.

In some embodiments, the harvester further comprises one or more moisture sensors in operable communication with the at least a first processing unit configured to obtain a moisture measurement in or proximate to the bale.

In some embodiments, the harvester further comprises one or more shape sensors in operable communication with the at least a first processing unit configured to obtain a measurement indicating a shape of the bale within the bale chamber.

In some embodiments, the at least first processing unit is configured to calculate an adjustment value, the adjustment value a function of one or more of: (i) one or a plurality of longitudinal and/or lateral slope measurements of the harvester; (ii) one or a plurality of values correlating to the size of the bale; (iii) one or a plurality of values correlating to the bale moisture measurement; and (iv) one or a plurality of values correlating to the shape of the bale; wherein the size of the bale is a function of a center of mass location of the bale; and wherein the value correlating to the shape of the bale is a function of the density measurements of the bale.

The disclosure also relates to a harvester comprising: a main frame, defining a front section of a bale chamber in which a bale is formed; a tailgate pivotally connected to the main frame, defining a rear section of the bale chamber, and configured to pivot open to eject the bale; at least a first load sensor, positioned on or within the tailgate, for measuring a weight force exerted thereon; and at least a first processing unit in operable communication with the at least a first load sensor.

The disclosure also relates to a harvester comprising: a main frame, defining a front section of a bale chamber in which a bale is formed; a tailgate pivotally connected to the main frame, comprising at least a first central member, defining a rear section of the bale chamber, and configured to pivot open to eject the bale; at least a first load sensor, positioned on or within the first central member, for measuring a weight force exerted thereon; and at least a first processing unit in operable communication with the at least a first load sensor.

The disclosure also relates to a method of obtaining a bale weight of a bale formed in a harvester comprising a bale chamber and one or a plurality of load sensors in operable communication with at least a first processing unit, the method comprising: determining, by the one or plurality of load sensors, one or a plurality of reference weights when the harvester is in a first operable state, wherein the first operational state comprises the bale chamber free of a bale; determining, by the one or a plurality of load sensors, one or a plurality of load weights when the harvester is in a second operable state, wherein the second operational state comprises the bale chamber comprising a formed or partially formed bale; calculating a bale weight value, by the at least first processing unit, the bale weight value a function of: (i) the one or more load weights; and (ii) the one or more reference weights; calculating an adjustment value, by the at least first processing unit, the adjustment value a function of one or more of: (i) one or a plurality of slope measurements of the harvester; (ii) one or a plurality of size measurements of the bale within the bale chamber; (iii) one or a plurality of bale moisture measurements of the bale within the bale chamber, and (iv) one or a plurality of bale shape measurements of the bale within the bale chamber; and calculating an output value, by the at least first processing unit, the output value a function of the bale weight value and the adjustment value.

In some embodiments, the method further comprises displaying on a monitor, via a display interface in operable communication with the at least first processing unit, the output value.

In some embodiments, the method further comprises one or more tailgate sensors in operable communication with the at least a first processing unit, the one or more tailgate sensors configured to detect the position of the tailgate.

In some embodiments, the method further comprises one or more tailgate sensors in operable communication with the at least a first processing unit, the one or more tailgate sensors configured to detect the position of the tailgate; and wherein, in the second operational state, the tailgate position is closed or substantially closed.

In some embodiments, in either the first or second operational state, one or plurality of slope measurements are a function of one or more values indicating a longitudinal angle upon which the harvester is positioned and/or one or more values indicating a lateral angle upon which the harvester is positioned.

In some embodiments, the method further comprises one or more inclinometers in operable communication with the at least a first processing unit configured to obtain one or more values indicating a longitudinal angle upon which the harvester is positioned and/or one or more values indicating a lateral angle upon which the harvester is positioned.

In some embodiments, the method further comprises one or more inclinometers in operable communication with the at least a first processing unit configured to obtain one or more values indicating a longitudinal angle upon which the harvester is positioned and/or one or more values indicating a lateral angle upon which the harvester is positioned; and wherein the value of the lateral angle upon which the harvester is positioned is calculated by at least two reference weight measurements in which the tailgate of the harvester is in at least two known positions.

In some embodiments, the method further comprises one or more bale diameter sensors in operable communication with the at least a first processing unit configured to obtain a size measurement of the bale within the bale chamber. In some embodiments, the size measurement of the bale is a function of a center of mass location of the bale.

In some embodiments, the method further comprises one or more moisture sensors in operable communication with the at least a first processing unit configured to obtain a moisture measurement in or proximate to the bale.

In some embodiments, the method further comprises one or more shape sensors in operable communication with the at least a first processing unit configured to obtain a measurement indicating a shape of the bale within the bale chamber.

In some embodiments, the at least first processing unit is configured to calculate an adjustment value, the adjustment value a function of one or more of: (i) one or a plurality of longitudinal and/or lateral slope measurements of the harvester; (ii) one or a plurality of values correlating to the size of the bale; (iii) one or a plurality of values correlating to the bale moisture measurement; and (iv) one or a plurality of values correlating to the shape of the bale; wherein the size of the bale is a function of a center of mass location of the bale; and wherein the value correlating to the shape of the bale is a function of the density measurements of the bale.

The disclosure also relates to a method of obtaining a bale weight of a bale formed in a harvester comprising a bale chamber and one or a plurality of load sensors positioned on, within, or proximate to a first load pin positioned at the pivot point between a main frame and a tailgate of the harvester, in operable communication with at least a first processing unit, the method comprising: determining, by the one or plurality of load sensors, one or a plurality of reference weights when the harvester is in a first operable state, wherein the first operational state comprises the bale chamber free of a bale; determining, by the one or a plurality of load sensors, one or a plurality of load weights when the harvester is in a second operable state, wherein the second operational state comprises the bale chamber comprising a formed or partially formed bale; calculating a bale weight value, by the at least first processing unit, the bale weight value a function of: (i) the one or more load weights; and (ii) the one or more reference weights; calculating an adjustment value, by the at least first processing unit, the adjustment value a function of one or more of: (i) one or a plurality of slope measurements of the harvester; (ii) one or a plurality of size measurements of the bale within the bale chamber; (iii) one or a plurality of bale moisture measurements of the bale within the bale chamber, and (iv) one or a plurality of bale shape measurements of the bale within the bale chamber; and calculating an output value, by the at least first processing unit, the output value a function of the bale weight value and the adjustment value.

DETAILED DESCRIPTION OF THE DISCLOSURE

Various terms relating to the methods and other aspects of the present disclosure are used throughout the specification and claims. Such terms are to be given their ordinary meaning in the art unless otherwise indicated. Other specifically defined terms are to be construed in a manner consistent with the definition provided herein.

As used in this specification and the appended claims, the singular forms "a," "an," and "the" include plural referents unless the content clearly dictates otherwise.

The term "more than 2" as used herein is defined as any whole integer greater than the number two, e.g. 3, 4, or 5.

The term "plurality" as used herein is defined as any amount or number greater or more than 1.

The terms "left" or "right" are used herein as a matter of mere convenience, and are determined by standing at the rear of the machine facing in its normal direction travel. Likewise, "forward" and "rearward" are determined by the normal direction of travel. "Upward" and "downward" orientations are relative to the ground or operating surface as are any references to "horizontal" or "vertical" planes.

The term "harvester" as used herein is defined as a machine that consolidates and/or packages material so as to facilitate the storage and handling of the material for later use. In some embodiments, the harvester is used to harvest agricultural material. In some embodiments, the harvester is an agricultural baler, a waste baler, or a combine comprising a baling mechanism. In some embodiments, the harvester is a round baler.

The term "material" as used herein is defined as a numerous individual items that are harvested or collected by the harvester. In some embodiments, the material is agricultural crop, such as hay or silage. In some embodiments, the material is biomass.

The term "pickup assembly" as used herein is defined as an element responsible for collecting material from the ground over which the harvester operates. A harvesting assembly includes a mechanism to pick up the material from the ground, and such mechanisms are well known in the agricultural industry. Reference is made, for example, to U.S. Patent Application No. US20130305683, which is incorporated herein by reference in its entirety, that illustrates such mechanisms.

The term "cutting implement" as used herein is defined as a device involved with the cutting of crop material, including one or a plurality of knives, blades, teeth, gears, grinders, sissors, or rotors. In some embodiments, the harvester assembly is equipped with a "rotor cutter" comprising a rotor, a plurality of knife blades attached to one or more knife units, components to support the knife units and allow for the insertion and removal of the knife units within the bottom floor assembly, and a slotted bottom floor through which the knife blades protrude. In some embodiments, the harvester assembly is equipped with a "rotor feeder" comprising a rotor and a solid bottom floor.

The term "bale chamber" as used herein is defined as any space within the harvester that is capable of forming a bale of harvested material. In some embodiments, the sides of the bale chamber are defined by oppositely facing side walls and the bottom of the bale chamber is defined by at least one floor roll that spans transverse to the sidewalls and that partially supports the weight of the bale in the bale chamber. In some embodiments, the bale chamber is also defined in its front region by an inlet through which harvested material or crop enters. In some embodiments, the front region of a first bale chamber is defined by an inlet or entry point which is in operable connection to a throat of a crop harvesting assembly, such as a pickup or rotary cutter, and which is defined in a space between the first sidewall, the second sidewall, the bale carrier, and a plurality of rollers positioned between and attached to the first and second sidewalls; wherein the plurality of rollers support one or more baling belts. In some embodiments, at least one, at least two, at least three, or at least four floor rollers extend transverse to the opposite sidewalls along the bottom and front of the bale chamber adjacent to the top and bottom of the entry point. In some embodiments, a bale carrier is positioned in and defines the back of the bale chamber by obstructing an outlet in it fully closed position. In some embodiments, the rollers extending beyond the side walls allow the width of the bale chamber to be selectively increased. In some embodiments, side walls which can be moved laterally, i.e., in the direction of the width of the round baler, that enable making bales of different width or the friction between the walls and bale to be reduced when ejecting the bale. In some embodiments, the top portion of the bale chamber is define by the position of one or more baling belts that wrap around a top portion of the crop material as its rotating in the bale chamber. In some embodiments, the baling belts are mounted on a series of rolls positioned above the bale chamber that exact tension on a the bale as it grows.

Discussions herein utilizing terms such as, for example, "processing," "computing," "calculating," "determining," or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Some embodiments may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be or may include an electronic, magnetic, optical, electromagnetic, InfraRed (IR), or semiconductor system (or apparatus or device) or a propagation medium. Some demonstrative examples of a computer-readable medium may include a semiconductor or solid state memory, magnetic tape, a removable computer diskette, a Random Access Memory (RAM), a Read-Only Memory (ROM), a rigid magnetic disk, an optical disk, or the like. Some demonstrative examples of optical disks include Compact Disk-Read-Only Memory (CD-ROM), Compact Disk-Read/Write (CD-R/W), DVD, or the like.

In some embodiments, a processing system comprises a processing device suitable for storing and/or executing program code and may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Many of the fastening, connection, processes and other means and components utilized in this disclosure are widely known and used in the field of the disclosure described, and their exact nature or type is not necessary for an understanding and use of the disclosure by a person skilled in the art, and they will not therefore be discussed in significant detail. Furthermore, the various components shown or described herein for any specific application of this disclosure can be varied and the practice of a specific application of any element may already be widely known or used in the art by persons skilled in the art and each will likewise not therefore be discussed in significant detail.

Agricultural harvesters, such as round balers, are well known in the agricultural industry, and the instant disclosure can be used with substantially any of such machines. Reference is made, for example, to U.S. Pat. Nos. 6,877,304; 6,688,092; 6,644,006 and 6,295,797 that illustrate such harvesters, the disclosures of which are incorporated herein by reference in their entirety. Embodiments of the present disclosure are particularly well suited, but in no way limited to, use with agricultural balers. The present disclosure may also find utility in agricultural harvesters including, for example, a round baler, a waste baler, a cotton harvester, or a combine. In some embodiments, the combine comprises a baling mechanism.

The present disclosure relates to accurately weighing bale of crop material in a harvester, such as a round baler, using one or more load sensors located in the tailgate section of the harvester. In some embodiments, the one or more load sensors are located in or around the one or more load pins that attach the tailgate to the main frame of the harvester. In some embodiments, the one or more load sensors are located in or around the central member of the tailgate.

In order to calculate the weight of a bale, the one or more load sensors acquire both a reference weight, defined as when the harvester is empty, and a load weight, defined as when the harvester contains a bale. In some embodiments, more than one reference weight and/or more than one load weight is acquired. In some embodiments, reference weights may be acquired when the tailgate is in a closed position, and/or when the tailgate is in an open position. In addition to the reference and load weight information, other factors may be necessary to accurately calculate bale weight, such as, but not limited to, the slope of the ground upon which the harvester rests, the size of the bale, the bale moisture content, and/or the shape of the bale.

A slope of the ground other than a neutral slope (i.e. the harvester is resting on flat ground) may alter the proportion of the bale that is supported by the tailgate section of the harvester. To determine the slope of the ground, both the longitudinal angle (i.e. front-to-back angle) and the lateral angle (i.e. side-to-side) of the harvester is measured. In some embodiments, both angles are measured by one or more inclinometers. In some embodiments, the longitudinal angle is measured by one or more inclinometers and the lateral angle is measured by taking at least two reference weights with the tailgate in different positions, for example, a fully open and a fully closed position. Consideration of the slope of the ground in calculating the weight of a bale inside a harvester, including the use of inclinometers, is described in U.S. patent application Ser. No. 13/725,117, which is incorporated by reference herein in its entirety.

As the bale grows in diameter inside the bale chamber, its center of mass moves rearward, altering the proportion of the bale that is supported by the tailgate section of the harvester. To determine the size of the bale, one or more bale diameter sensors measure the bale diameter while the bale is in the bale chamber.

Moisture on the crop material may add significant weight, and is often unevenly distributed throughout the baling process. An uneven bale moisture may alter the proportion of the bale that is supported by the tailgate section of the harvester. To determine bale moisture, one or more moisture sensors measure the moisture content throughout the bale. In some embodiments, at least two moisture sensors measure the moisture content at different locations in the bale.

Bale shape may often by uneven due to variations in crop thickness and/or harvesting conditions, leading to variations in density. Similar to bale moisture, an uneven bale shape may alter the proportion of the bale that is supported by the tailgate section of the harvester. To determine bale shape, one or more shape sensors measure the overall shape of the bale. In some embodiments, the one or more shape sensors measure bale density. In some embodiments, at least two shape sensors measure bale density and/or bale shape at different locations in the bale.

The one or more load sensors, and optionally the one or more inclinometers, bale diameter sensors, moisture sensors, and/or shape sensors, are in operable communication with one or more processing units which collect the information from said sensors and calculate the bale weight according the following formula:

$$W_{bale} = (F_{load} - F_{ref}) * K$$

where $W_{bale}$ is i the output value, $F_{load}$ is the load weight, or alternatively the average of two or more load weights, $F_{ref}$ is the reference weight, or alternatively the average of one or more reference weights, and K is an adjustment value based in part on (i) one or more slopes on a surface on which the harvester is positioned; (ii) bale size; (iii) bale moisture, and (iv) bale shape. The output value $W_{bale}$ is the calculated bale weight. In some embodiments, the calculation ($F_{load} - F_{ref}$) is the bale weight value. In some embodiments, when the one or more slopes, the bale size, the bale moisture, and/or the bale shape, alone or in any combination, cause the tailgate section of the harvester to proportionally support more of the mass of the bale, the adjustment factor K is less than 1. In some embodiments, when the one or more slopes, the bale size, the bale moisture, and/or the bale shape, alone or in any combination, cause the tailgate section of the harvester to proportionally support less of the mass of the bale, the adjustment factor K is greater than 1.

In some embodiments, the one or more processing units are also in operable communication with a display interface. When the one or more processing units have calculated the output value $W_{bale}$, an indication of the calculated bale weight can be displayed on a monitor.

Figure 1:
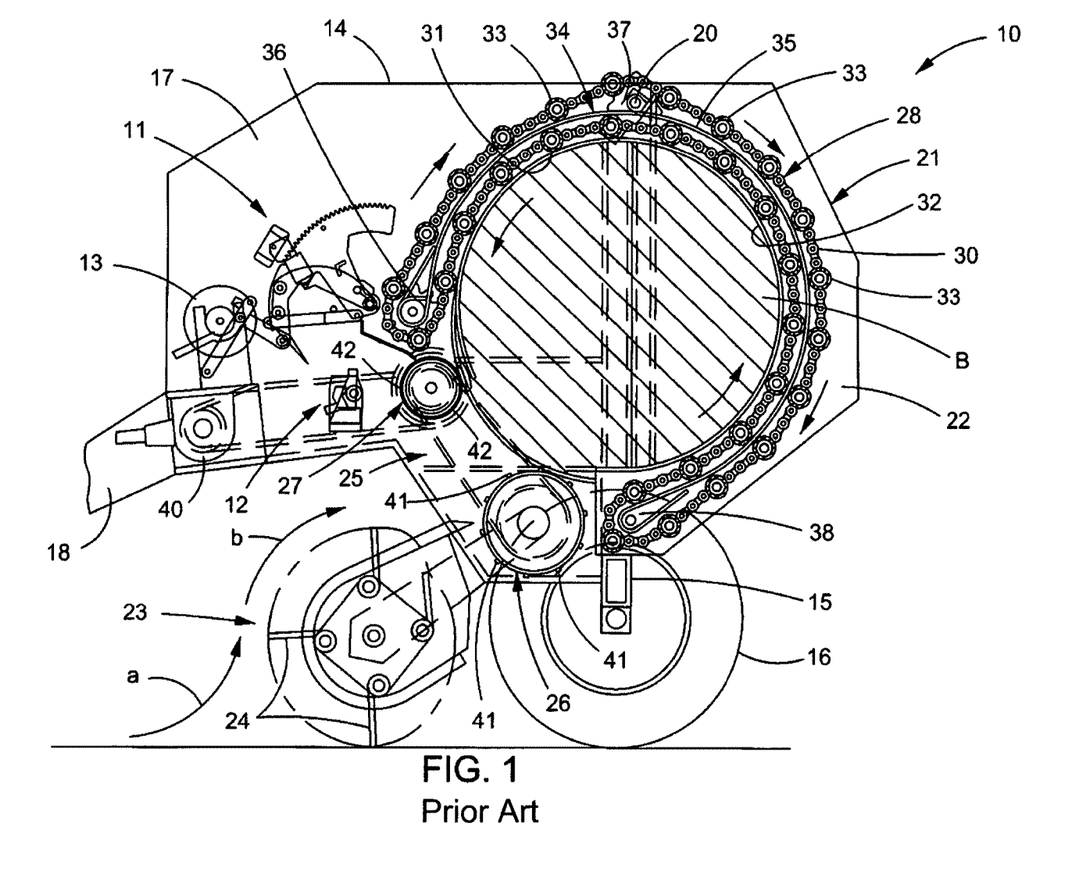
FIG. 1 depicts a cutaway side view of an exemplary round baler in which the present invention may be employed.

FIG. 1 depicts an exemplary agricultural round baler, generally designated 10, in which embodiments of the present invention may be employed. As previously noted, crop in the field is usually arranged in a windrow as it is engaged by the baler 10 being pulled along the windrow of cut crop material by a tractor (not shown). The baler 10 has a wrapping system for wrapping a cylindrical bale B formed in a round baler 10. The wrapping system of baler 10 comprises a net dispensing assembly 11 and a cutting assembly 12 for cutting web material, such as net, issued from a supply roll 13. As shown, baler 10 includes a main frame 14 with a main support beam 15 on which a pair of wheels 16 (only one shown) are rotatably affixed. The main frame 14 includes a pair of side walls 17 (only one shown) between which a cylindrical bale forming chamber extends.

The baler 10 also includes a tongue 18 extending from the forward portion of main frame 14 for conventional connection to a tractor (not shown). Pivotally connected to the sidewalls 17 of main frame 14 by a pair of load pins 20 (only one shown) is tailgate 21 which may be closed (as shown in FIG. 1) during bale formation or pivoted open about stub shafts 20 to discharge a completed bale. The tailgate includes tailgate walls 22 coextensive with side walls 17. A pickup assembly 23 mounted on main frame 14 in a suitable manner includes a plurality of fingers or tines 24 moveable in a predetermined path to lift crop material from the ground, generally depicted by direction arrow a, and deliver it rearwardly (arrow b) toward a transverse inlet 25 in the chamber defined by a floor roll 26 and a transverse stripper roll 27, both of which rolls are rotatably supported on mainframe 14 between sidewalls 17.

As shown, the bale forming chamber is defined primarily by an apron assembly 28 comprising a pair of support chains 30 mounted to travel along a continuous path, the inner run of which is defined on sidewalls 17 and tailgate walls 22 by front and rear sections 31, 32 of a continuous chain guide track that separates at a point of track adjacent the load pins 20 during bale discharge. The apron further comprises a plurality of parallel tubular crop engaging slats 33 extending between chains 30 to provide a cage-like periphery of the cylindrically shaped chamber. Radially outward of the inner run of apron assembly 28 are front and rear sections 34, 35 of continuous cylindrical bale chamber wall. These sections, also separable during bale discharge, are mounted between side walls 17 and tailgate walls 22, respectively, for maintaining integrity between the outer and inner runs of chain 30. Operatively engaged with chain 30 are drive sprocket 36 mounted between sidewalls 17, idler sprockets 37 also mounted between sidewalls 17 on load pins 20, and idler sprocket 38 mounted between tailgate walls 22. A conventional chain drive system for drive sprocket 36 is provided via appropriate coupling to gearbox 40 in a conventional manner, diagrammatically depicted in phantom outline outwardly of sidewall 17. The bale forming chamber is further defined by the outer conveying surfaces of floor roll 26 and stripper roll 27, both of which are driven in a direction opposite that of the bale chamber direction by conventional drive means appropriately coupled to gear box 40. The floor roll 26 receives bale material at its forward surface, moving the bale material upward and rearward, clockwise as shown in FIG. 1. Bale material leaves the floor roll 26 and enters the bale chamber which rotates moving the bale material from a lower position, rearward and upward in a circular motion, counterclockwise as shown in FIG. 1. These rolls 26, 27 may be provided with ribs 41, 42 to enhance their ability to convey crops in the chamber as a bale is being formed. Other forms of aggressive surface structure may be used to accommodate various types of crops and conditions.

Figure 2A:
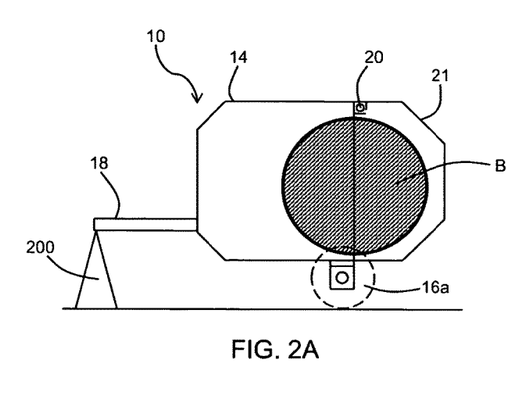
FIGS. 2A and 2B depict a simplified side and rear view, respectively, of an exemplary round baler.
Figure 2B:
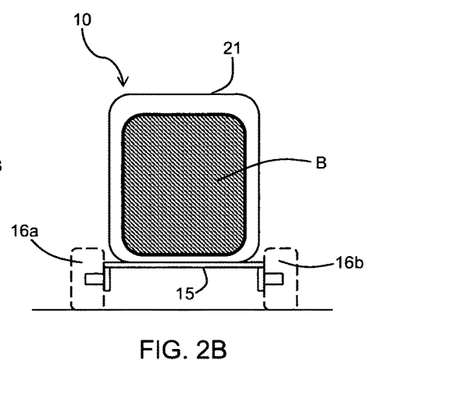

FIGS. 2A, and 2B depict a side and rear view, respectively, of the exemplary round baler 10, in a simplified form for purposes of describing the bale weighing process of the present invention. Shown are the main frame 14, the tailgate 21, the load pins (only one shown) 20, the tongue 18, the main support beam 15 on which the pair of wheels 16 (16a, 16b) are affixed, and a coupling point 200 at which the baler 10 is coupled to a tractor. Also shown is bale B, formed by operation of the baler 10.

Figure 3A:
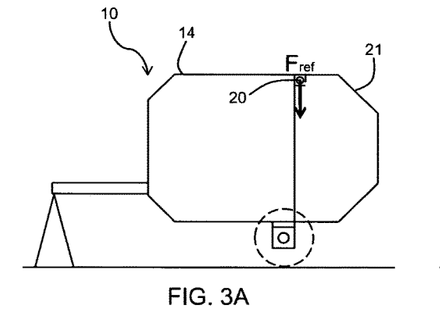
FIGS. 3A, 3B, 3C, 3D, and 3E depict side views of embodiments in which force measurements are taken throughout the baling cycle.
Figure 3B:
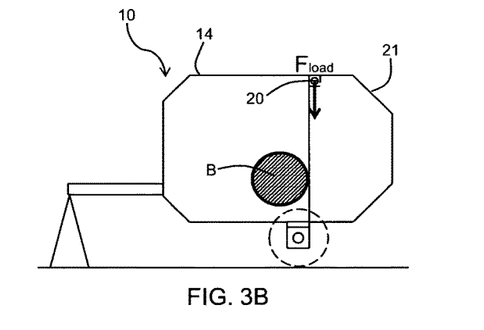
Figure 3C:
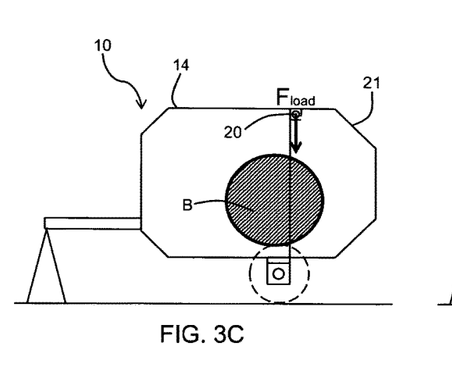
Figure 3D:
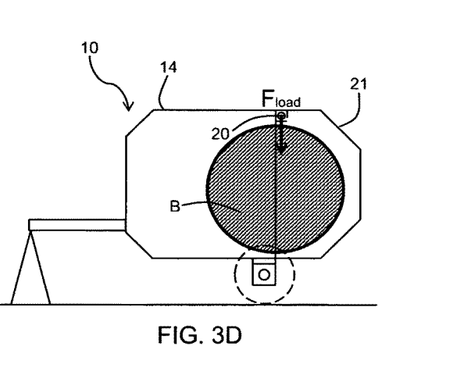
Figure 3E:
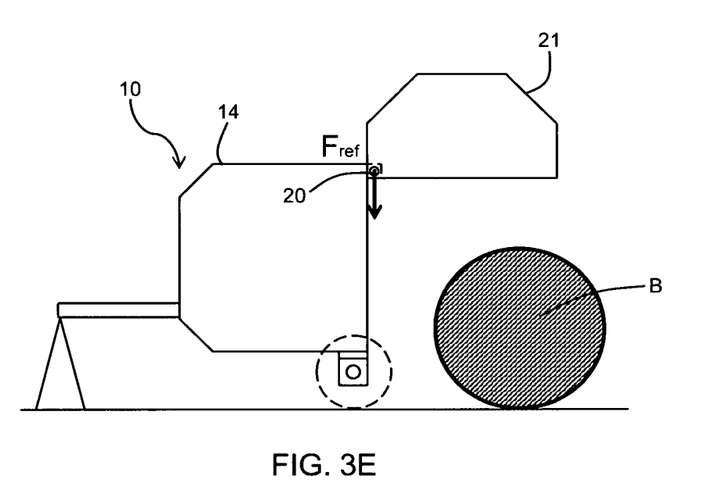

FIGS. 3A-3E depict the function of the components of the exemplary round baler 10 through the baling process. It is understood that the components of the baler 10 may function in a serial, stepwise or simultaneous fashion but that all steps described in FIGS. 3A, 3B, 3C, 3D, and 3E illustrate one embodiment of a baling cycle for purposes of the invention. Shown are the main frame 14, the tailgate 21, the load pins (only one shown) 20, and the bale B at various points of formation. FIG. 3A depicts the baler 10 empty at the start of the cycle. The reference weight $F_{ref}$ in FIG. 3A represents a measurement of the weight of the empty tailgate 21 as taken by one or more load sensors positioned on or within one or both load pins 20. FIGS. 3B, 3C, and 3D depict the baler 10 as a bale is formed in the bale chamber. The load weight $F_{load}$ in FIGS. 3B-3D represents a measurement of the weight of the tailgate 21 and the weight of the bale supported by the tailgate 21. As the bale grows in size from FIG. 3B to 3D, the center of mass of the bale shifts rearward toward the tailgate 21, increasing the numerical value of $F_{load}$. FIG. 3E depicts the baler 10 at the end of the cycle with the tailgate 21 open and the bale B deposited on the ground. The reference weight $F_{ref}$ in FIG. 3E represents a measurement of the weight of the empty tailgate 21 when the tailgate is in an open position.

In the example measurement configurations described above, the weight of the baler 10 empty may be based on measurements when the tailgate 21 has moved to the open position and/or when the tailgate 21 has moved to the closed position. This requires that the baler remain stationary for some moments after the tailgate has closed to get an acceptable empty baler weight. In another embodiment, the empty baler weight is based on measurements taken during the closing cycle of the tailgate 21, which provides uniform data as the tailgate 21 is moving through a controlled descent. A tailgate closed switch incorporated in and in operable communication with the tailgate 21 indicates when the tailgate 21 is closed. According to this embodiment, the empty baler weight is determined based on data obtained during a set amount of time prior to the tailgate switch closing. Since noise is generated in the data at essentially the same time the tailgate switch closes, the useable data may be in a range from about 2 seconds to about 0.5 seconds prior to the tailgate closing, for example. Other ranges of data, over about 2 seconds or less than about 0.5 seconds may also be used.

Figure 4:
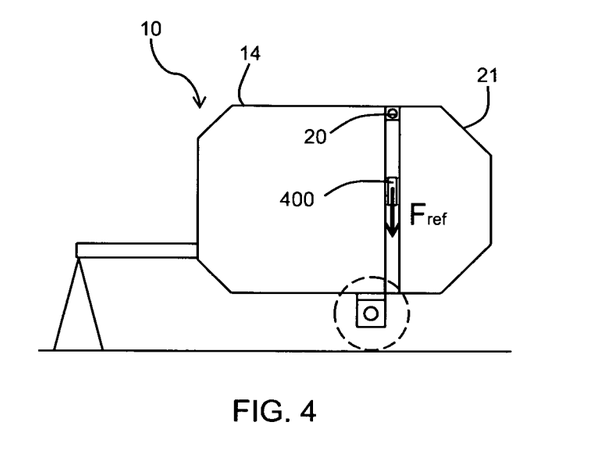
FIG. 4 depicts a simplified round baler with an alternative embodiment of load sensor location.

FIG. 4 depicts an alternative embodiment of the baler 10 where the load sensors 400 is positioned on or within the central member 410 of the tailgate 21. Also shown are the load pins (only one shown) 20, which still serve to connect the tailgate 21 to the main frame 14 of the baler 10. The reference weight $F_{ref}$ represents a measurement of the weight of the empty tailgate 21. In some embodiments, the bale weight calculations involved with the alternative embodiment depicted in FIG. 4 are not substantially different than the bale weight calculations involved with the embodiment depicted in FIGS. 3A-3E.

Figure 5:
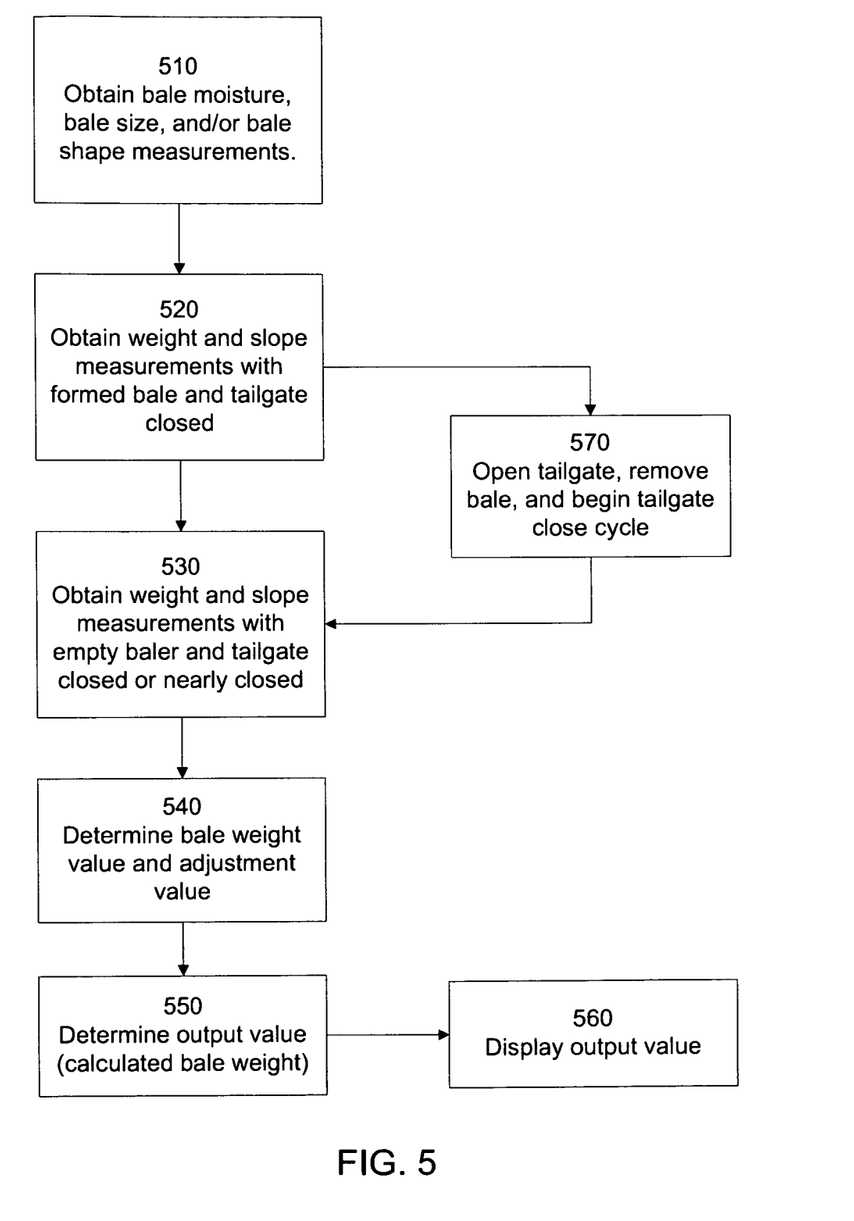
FIG. 5 depicts a flowchart of an exemplary method of weighing a bale.

FIG. 5 illustrates a flowchart of an exemplary method of weighing a bale utilizing one or more load sensors and the one or more inclinometers, size sensors, moisture sensors, and/or shape sensors as described above with reference to the baling cycle and load sensor position of FIGS. 3A-3E, and FIG. 4.

At 510, bale moisture, bale size, and/or bale shape measurements are obtained as the bale B is being formed in the baler 10. At 520, at a first measurement configuration of the baler 10 in which the bale B is formed and the tailgate 21 of the baler 10 is closed, a load weight of the tailgate 21 and the longitudinal incline and lateral incline of the baler 10 are obtained (see FIG. 3D).

At 530, when the baler 10 is in a second measurement configuration in which the bale B is removed from the baler 10 and the tailgate 21 is closed or nearly closed, a reference weight of the tailgate 21 and the longitudinal incline and lateral incline of the baler 10 is obtained (see FIG. 3E). According to an embodiment, the reference weight is based on measurements taken during the closing cycle of the tailgate 21.

At 540, a bale weight value is determined, which is a function of the reference weight and the load weight, and an adjustment value is determined, which is a function of the longitudinal and lateral inclines of the baler 10, as well as bale size, bale moisture, and/or bale shape.

At 550, an output value (i.e. calculated bale weight) is determined by multiplying the bale weight value by the adjustment value. At 560, an indication of the weight of the bale B may be displayed, for example, by a monitor in the cab of the baler 10.

At 570, alternatively following 520, after the load weight is taken, the bale B may be removed and the close cycle of the tailgate 21 may begin. The load sensors and/or the inclinometers present in the baler 10 may provide an indication (i.e., signal) to a processing device that the load weight measurement is complete, thereby indicating that the tailgate 21 should open and that the formed bale B should be ejected, the operation of which may be controlled by a processing device. Alternately, the baler 10 may wait a predetermined amount of time before moving to step 530 after the bale B is formed and/or wrapped.

Figure 6:
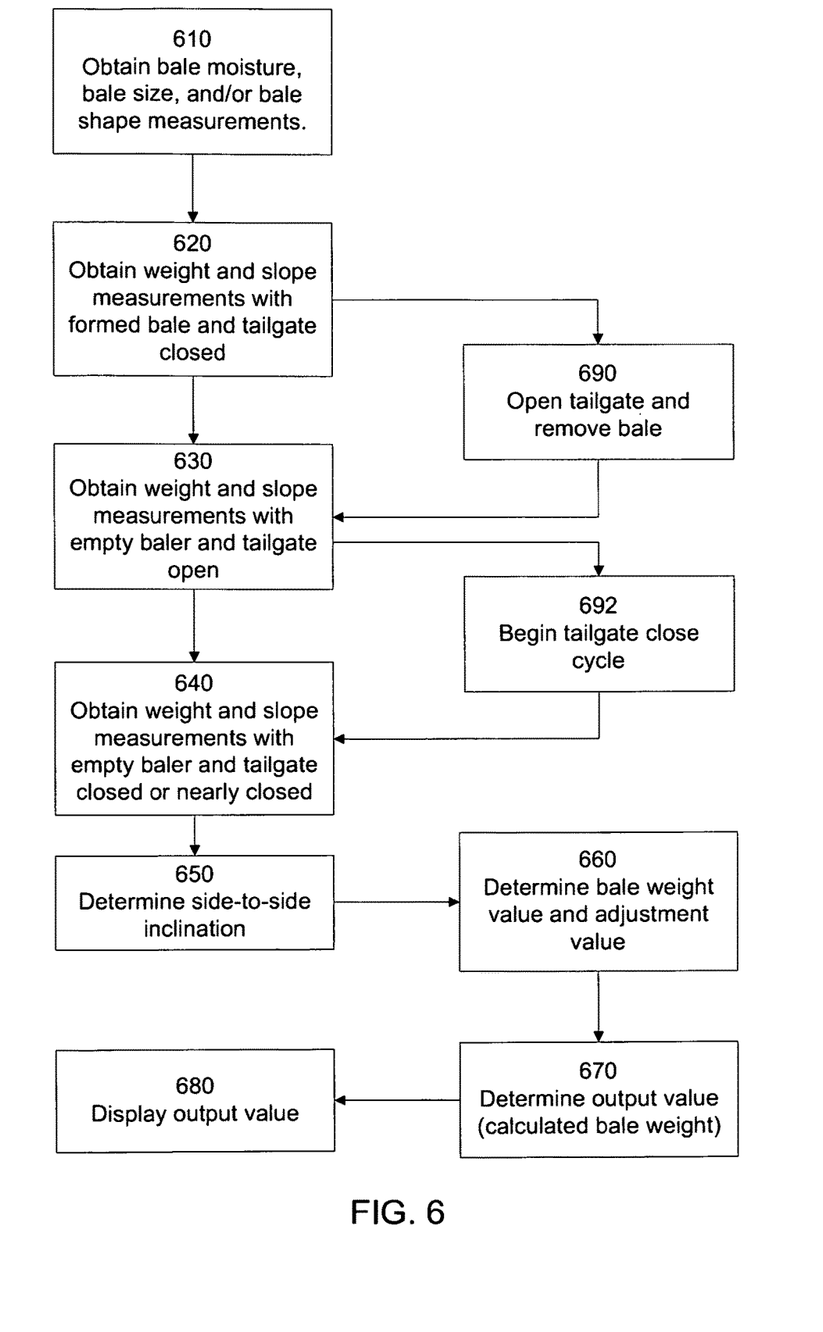
FIG. 6 depicts an alternative embodiment of an exemplary method of weighing a bale.

FIG. 6 illustrates a flowchart of another exemplary method of weighing a bale utilizing one or more load sensors and the one or more inclinometers, size sensors, moisture sensors, and/or shape sensors as described above with reference to the baling cycle and load sensor position of FIGS. 3A-3E, and FIG. 4.

At 610, a bale moisture, bale size, and/or bale shape measurements are obtained as the bale B is being formed in the baler 10. At 620, when the bale B is formed and the tailgate 21 of the baler 10 is closed, a load weight of the tailgate 21 and a longitudinal incline of the baler 10 are obtained (see FIG. 3D).

At 630, when the bale B is removed from the baler 10 and the tailgate 21 is opened, a first reference weight is obtained. At 640, when the bale B is removed from the baler 10 and the tailgate 21 is closed or nearly closed, a second reference weight is obtained. At 650, the lateral incline of the baler 10 is determined as a function of the first and second reference weights.

At 660, a bale weight value of the bale B is determined by subtracting either the first reference weight, the second reference weight, or an average of the first and second reference weights from the load weight. An adjustment value which is a function of the longitudinal and lateral inclines of the baler 10, as well as bale size, bale moisture, and/or bale shape.

At 670, an output value (i.e. calculated bale weight) is determined by multiplying the bale weight value by the adjustment value. At 680, an indication of the weight of the bale B may be displayed, for example, by a monitor in the cab of the baler 10.

At 690, following 620, after the load weight is taken, load sensors and/or inclinometers present in the baler 10 may provide an indication (i.e., signal) to a processing device that the measurements are complete, thereby indicating that the tailgate 21 should be opened and the formed bale B should be ejected, the operation of which may be controlled by a processing device. Alternately, a predetermined amount of time may pass before the opening of the tailgate 21 and the ejection of the bale B.

At 692, following 630, after the first reference weight is taken, the tailgate 21 is moved to a closed position. The load sensors and/or inclinometer present in the baler 10 may provide an indication (i.e., signal) to a processing device that the measurement is complete, thereby indicating that the tailgate 21 should begin closing, the operation of which may be controlled by a processing device. Alternately, a predetermined amount of time may pass after the bale B is ejected from the baler 10 before the tailgate 21 begins closing.

Figure 7:
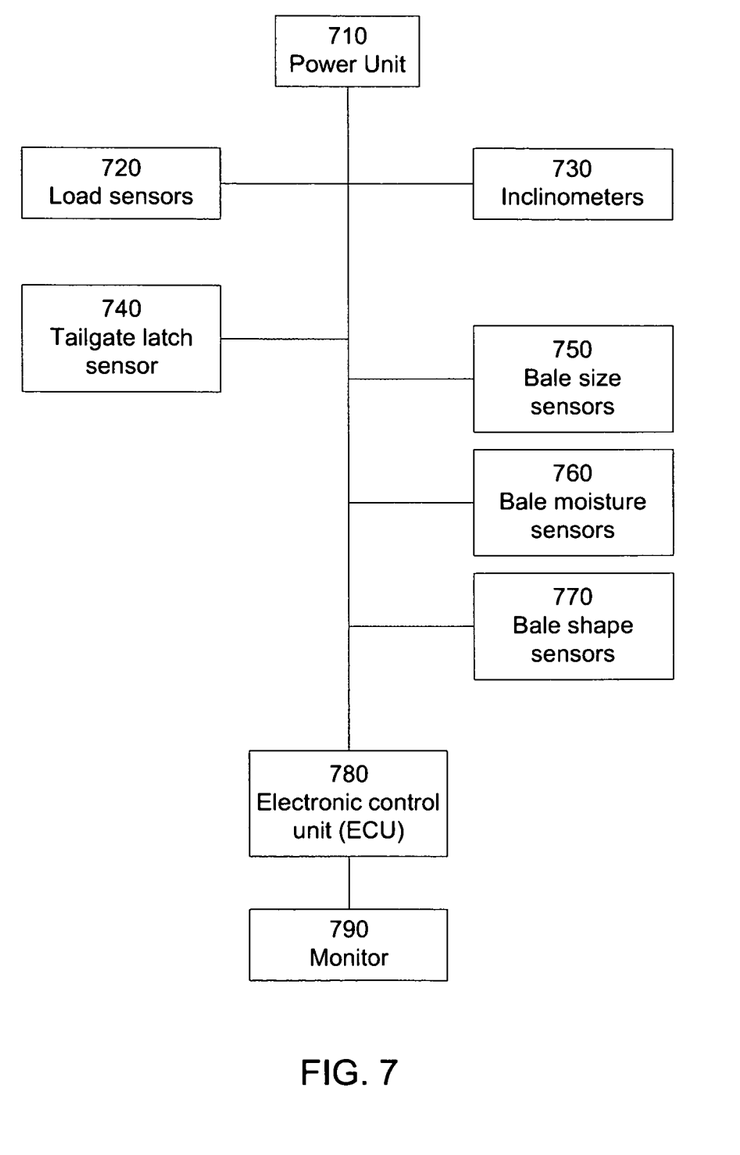
FIG. 7 depicts a block diagram of components utilized for weighing a bale.

FIG. 7 is a block diagram of the components for weighing a bale. A power unit 710 may provide power to one or more of the other components, including one or more load sensors 720, one or more inclinometers 730, a tailgate latch sensor 740, one or more bale size sensors 750, one or more bale moisture sensors 760, one or more bale shape sensors 770, an electronic control unit (ECU) 780, and a monitor 790.

The ECU 780 may be a processing device, computing device, processor, or the like for performing calculations and operations described herein. The ECU 780 may perform calculations related to one or more load weights, one or more reference weights, and one or more adjustment factors in determining the weight of a bale. The ECU 780 may also operate to move the tailgate 21 to the various positions for obtaining the measurements. The ECU 780 interfaces with the power unit 710, the one or more load sensors 720, the one or more inclinometers 730, a tailgate latch sensor 740, one or more bale size sensors 750, one or more bale moisture sensors 760, one or more bale shape sensors 770, and a monitor 790.

The ECU 780 may also interface with one or more memory devices (not shown) such as read only memory (ROM), random access memory (RAM), and one or more optional non-transitory memory devices such as, for example, an external or internal DVD drive, a CD ROM drive, a hard drive, flash memory, a USB drive, or the like. The memory devices may be configured to include individual files and/or one or more databases for storing any software modules, instructions, or data. The memory devices may store pre-determined information and date related to the correction factors, for example. Program instructions, software, or interactive modules for performing any of the functional steps associated with the processes as described above may be stored in the ROM and/or the RAM. Optionally, the program instructions may be stored on a tangible computer readable medium such as a compact disk, a digital disk, flash memory, a memory card, a USB drive, an optical disc storage medium, such as a Blu-ray™ disc, and/or other recording medium.

A display interface may permit information from the ECU 780 to be displayed on the monitor 790 in audio, visual, graphic, and/or alphanumeric format. For example, the monitor 790 may be positioned in a cab utilized by the operator of the baling process so that the operator may safely and conveniently see the information during and after operation, such as the weight measurements of a bale. Communication with external devices may occur using various communication ports that may be attached to one or more communications networks, such as the Internet or a local area network, or directly to a portable computing device such as a notebook computer. An interface may allow for receipt of data from input devices such as a keyboard, a mouse, a joystick, a touch screen, a remote control, a pointing device, a video input device, an audio input device, and the like accessible by the operator. In some embodiments, the harvester or methods disclosed herein comprise any one element or step disclosed in U.S. application Ser. Nos. 14/567,612, 13/725,117, 12/045,631, and U.S. Pat. No. 5,622,104. In some embodiments, the harvester does not comprise a bale cradle. In some embodiments, the singular, two-way, proportional valve connected with a supplementary valve arrangement and located between the tensioning cylinders and the tailgate cylinders for controlling pressure requirements between the tensioning cylinders.

Having described a series of embodiments, it will become apparent that various modifications can be made without departing from the scope of the disclosure as defined in the accompanying claims. Various publications, including patents, published applications, technical articles and scholarly articles are cited throughout the specification. Each of these cited publications and patent applications is incorporated by reference herein in its entirety.

What is claimed is:

1. A harvester, comprising:
    a main frame defining a front section of a bale chamber in which a bale is formed;
    a tailgate pivotally connected to the main frame by a load pin, the tailgate defining a rear section of the bale chamber in which the bale is formed, the tailgate configured to open by pivoting on the load pin to eject the bale from the bale chamber;
    a load sensor positioned on or within the load pin for measuring a weight force exerted on the load pin by the tailgate and the bale; and
    a processing unit in operable communication with the load sensor;
    wherein as the bale is formed within the bale chamber, a center of mass of the bale moves rearward from the main frame to the tailgate to alter the weight force exerted on the load pin by the tailgate and the bale.

2. The harvester of claim 1, wherein the load sensor is configured to obtain one or a combination of : (i) one or a plurality of reference weights in a first operational state; and (ii) one or a plurality of load weights in a second operational state; wherein the first operational state comprises the bale chamber free of the bale and the second operational state comprises the bale chamber comprising a formed or partially formed bale; and wherein the processing unit is configured to calculate a bale weight value, the bale weight value a function of the one or plurality of reference weights and/or the one or plurality of load weights.

3. The harvester of claim 2, wherein the processing unit is configured to calculate an adjustment value, the adjustment value a function of one or more of: (i) one or a plurality of slope measurements of the surface upon which the harvester is positioned; (ii) one or a plurality of size measurements of the bale within the bale chamber; (iii) one or a plurality of bale moisture measurements of the bale within the bale chamber, and (iv) one or a plurality of bale shape measurements of the bale within the bale chamber.

4. The harvester of claim 3, wherein the processing unit is configured to calculate an output value, the output value a function of the bale weight value and the adjustment value.

5. The harvester of claim 4, further comprising a monitor comprising a display interface in operable communication with the processing unit, wherein the display interface is configured to display the output value.

6. The harvester of claim 3, wherein, in either a first or second operational state, one or plurality of slope measurements are a function of one or more values indicating a longitudinal angle upon which the harvester is positioned and/or one or more values indicating a lateral angle upon which the harvester is positioned.

7. The harvester of claim 2, further comprising one or more tailgate sensors in operable communication with the processing unit, the one or more tailgate sensors configured to detect the position of the tailgate; and wherein, in the second operational state, the tailgate position is closed or substantially closed.

8. The harvester of claim 2, further comprising one or more inclinometers in operable communication with the processing unit configured to obtain one or more values indicating a longitudinal angle upon which the harvester is positioned and/or one or more values indicating a lateral angle upon which the harvester is positioned; and wherein the value of the lateral angle upon which the harvester is positioned is calculated by at least two reference weight measurements in which the tailgate of the harvester is in at least two known positions.

9. The harvester of claim 2, further comprising one or more bale diameter sensors in operable communication with the processing unit configured to obtain a size measurement of the bale within the bale chamber.

10. The harvester of claim 9, wherein the size measurement of the bale is a function of the center of mass location of the bale.

11. The harvester of claim 2, further comprising one or more moisture sensors in operable communication with the processing unit configured to obtain a moisture measurement in or proximate to the bale.

12. The harvester of claim 2, further comprising one or more shape sensors in operable communication with the processing unit configured to obtain a measurement indicating a shape of the bale within the bale chamber.

13. The harvester of claim 2, wherein the processing unit is configured to calculate an adjustment value, the adjustment value a function of one or more of: (i) one or a plurality of longitudinal and/or lateral slope measurements of the harvester; (ii) one or a plurality of values correlating to the size of the bale; (iii) one or a plurality of values correlating to the bale moisture measurement; and (iv) one or a plurality of values correlating to the shape of the bale; wherein the size of the bale is a function of the center of mass location of the bale; and wherein the value correlating to the shape of the bale is a function of the density measurements of the bale.

14. The harvester of claim 1, further comprising one or more tailgate sensors in operable communication with the processing unit, the one or more tailgate sensors configured to detect the position of the tailgate.

15. The harvester of claim 1, further comprising one or more inclinometers in operable communication with the processing unit configured to obtain one or more values indicating a longitudinal angle upon which the harvester is positioned and/or one or more values indicating a lateral angle upon which the harvester is positioned.

16. A method of obtaining a bale weight of a bale formed in a harvester comprising a bale chamber and one or a plurality of load sensors in operable communication with a processing unit, the method comprising:
    determining, by the one or plurality of load sensors, one or a plurality of reference weights when the harvester is in a first operable state, wherein the first operational state comprises the bale chamber free of a bale;
    determining, by the one or a plurality of load sensors, one or a plurality of load weights when the harvester is in a second operable state, wherein the second operational state comprises the bale chamber comprising a formed or partially formed bale;
    calculating a bale weight value, by the processing unit, the bale weight value a function of: (i) the one or more load weights; and (ii) the one or more reference weights;
    calculating an adjustment value, by the processing unit, the adjustment value a function of bale moisture measurements simultaneously measured at two or more different locations in the bale; and
    calculating an output value, by the processing unit, the output value a function of the bale weight value and the adjustment value.

17. The method of claim 16, further comprising one or more inclinometers in operable communication with the processing unit configured to obtain one or more values indicating a longitudinal angle upon which the harvester is positioned and/or one or more values indicating a lateral angle upon which the harvester is positioned; and wherein the value of the lateral angle upon which the harvester is positioned is calculated by at least two reference weight measurements in which the tailgate of the harvester is in at least two known positions.

18. The method of claim 16, wherein the adjustment value is a function of one or a plurality of size measurements of the bale within the bale chamber, and the size measurement of the bale is a function of a center of mass location of the bale.

19. The method of claim 16, wherein the processing unit is configured to calculate an adjustment value, the adjustment value a function of one or more of: (i) one or a plurality of longitudinal and/or lateral slope measurements of the harvester; (ii) one or a plurality of values correlating to a size of the bale; (iii) one or a plurality of values correlating to the bale moisture measurements; and (iv) one or a plurality of values correlating to the shape of the bale; wherein the size of the bale is a function of a center of mass location of the bale; and wherein the value correlating to the shape of the bale is a function of the density measurements of the bale.

20. A method of obtaining a bale weight of a bale formed in a harvester comprising a bale chamber and one or a plurality of load sensors positioned on, within, or proximate to a load pin positioned at the pivot point between a main frame and a tailgate of the harvester, in operable communication with a processing unit, the main frame defining a front section of the bale chamber in which the bale is formed, and the tailgate defining a rear section of the bale chamber in which the bale is formed, the method comprising:
    determining, by the one or plurality of load sensors, one or a plurality of reference weights on the load pin when the harvester is in a first operable state, wherein the first operational state comprises the bale chamber free of a bale and the one or a plurality of reference weights correspond with a weight force exerted on the load pin by the tailgate;
    determining, by the one or a plurality of load sensors, one or a plurality of load weights on the load pin when the harvester is in a second operable state, wherein the second operational state comprises the bale chamber comprising a formed or partially formed bale and the one or a plurality of load weights correspond with a weight force exerted on the load pin by the tailgate and the formed or partially formed bale, wherein as the bale is formed within the bale chamber, a center of mass of the bale moves rearward from the main frame to the tailgate to alter the weight force exerted on the load pin;
    calculating a bale weight value, by the processing unit, the bale weight value a function of: (i) the one or more load weights; and (ii) the one or more reference weights;
    calculating an adjustment value, by the processing unit, the adjustment value a function of bale moisture measurements simultaneously measured at two or more different locations in the bale; and
    calculating an output value, by the processing unit, the output value a function of the bale weight value and the adjustment value.

* * * * *